Dec. 25, 1962 L. D. DUNN 3,069,866
BEVERAGE MAKER
Filed Dec. 22, 1959 5 Sheets-Sheet 1

INVENTOR.
Lyman D. Dunn
BY
Hofgren, Brady, Wegner, Allen & Stellman
Attorneys

Dec. 25, 1962

L. D. DUNN 3,069,866

BEVERAGE MAKER

Filed Dec. 22, 1959

INVENTOR.
Lyman D. Dunn
BY
Hofgren, Brady, Wegner, Allen & Stellman
attorneys

Dec. 25, 1962 L. D. DUNN 3,069,866
BEVERAGE MAKER
Filed Dec. 22, 1959 5 Sheets-Sheet 3

INVENTOR.
Lyman D. Dunn
BY Hofgren, Brady, Wegner, Allen & Stellman
Attorneys

Dec. 25, 1962
L. D. DUNN
3,069,866
BEVERAGE MAKER
Filed Dec. 22, 1959
5 Sheets-Sheet 4
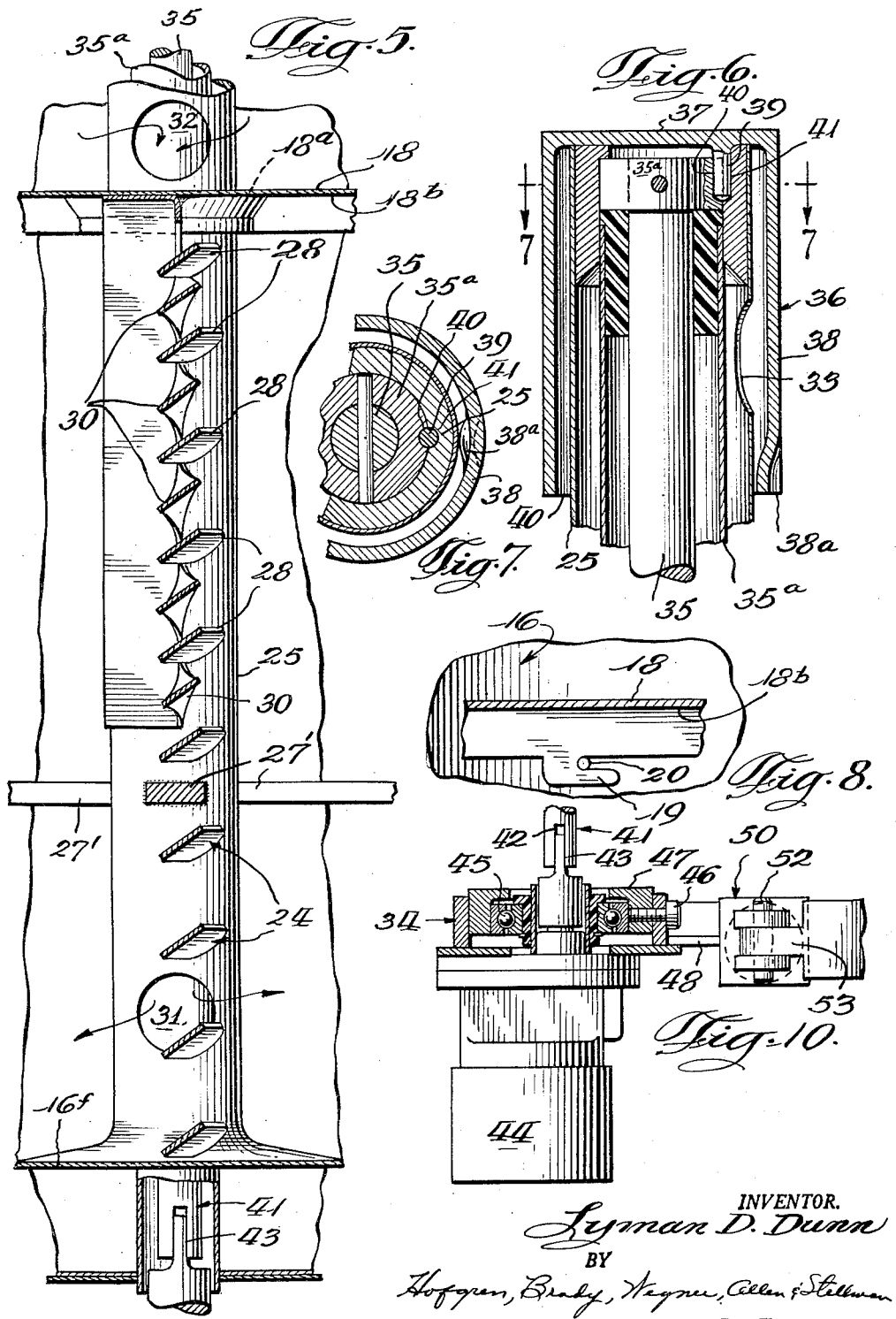
INVENTOR.
Lyman D. Dunn
BY
Hofgren, Brady, Wegner, Allen & Stellman
Attorneys

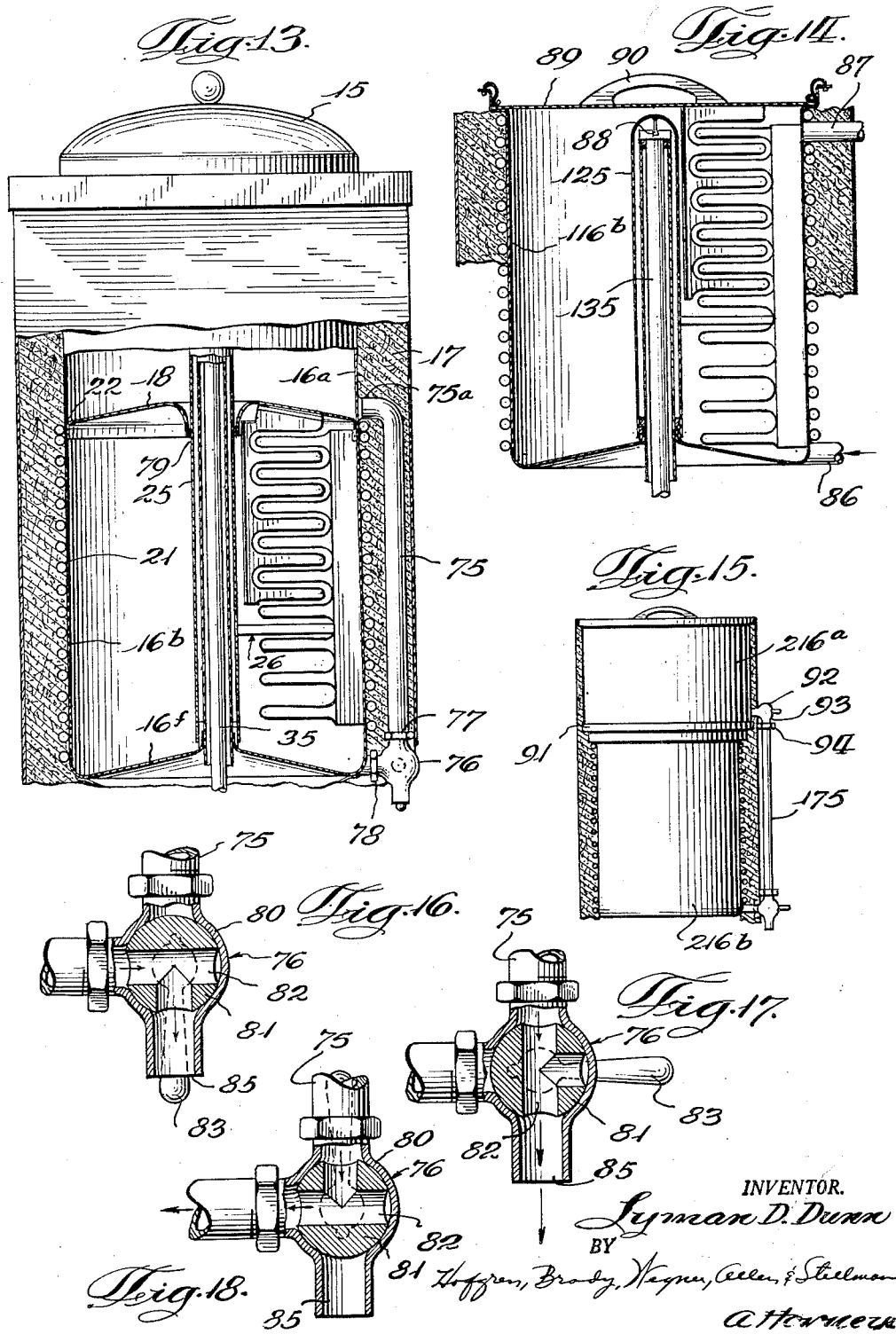

United States Patent Office 3,069,866
Patented Dec. 25, 1962

3,069,866
BEVERAGE MAKER
Lyman D. Dunn, 2555 S. Parkway, Chicago 16, Ill.
Filed Dec. 22, 1959, Ser. No. 861,348
26 Claims. (Cl. 62—136)

This invention relates to an apparatus for producing a flavored beverage including a plurality of discrete ice particles.

Flavored drinks containing a plurality of ice particles have become quite popular. Such beverages are commonly referred to as slush drinks and may be, for example, an orange slush which would be an aqueous solution containing orange flavor and a sizeable proportion of discrete ice particles.

On consumption, a slush drink is a refreshing and tantalizing drink, mainly because it contains a large number of ice particles. These ice particles are normally produced by partially freezing the flavored solution. However, a certain number of difficulties are encountered in preparing the drink since the ice crystals may be either too small or too large or may tend to clump or agglomerate.

In ice cream and soft serve products, the object is to produce a product having very fine ice crystals. Thus, the machines use very fast, highly refrigerated freezing surfaces and very sharp scrapers to remove the material frozen thereon. On the other hand, in the production of slush drinks, it is desirable to have relatively large crystals as compared with those of the ice cream and soft serve. The production of such crystals requires a larger freezing surface and less refrigeration so that ice crystals will grow.

Slush drinks of this nature are most easily prepared and dispensed from a machine designed to produce them automatically. However, much the same problems as mentioned above are attendant on these machines. Further control of the mixing and refrigerating facilities of such machines has been considered very difficult in the past.

It is therefore an object of this invention to provide an apparatus for producing a flavored drink including a plurality of discrete ice particles which is free from the objections mentioned above.

It is another object of this invention to provide such an apparatus which has a movable agitator positioned in the container which is adapted to remove the solidified or frozen material from a container freezing surface as discrete particles and to mix the particles with the remainder of the drink liquid.

It is yet another object of this invention to provide such an apparatus wherein the agitator driving means and the refrigeration means are responsive to the consistency of the ice containing beverage.

It is still another object of this invention to provide a torque control for the drive means for the agitator which is adapted to shut off the refrigeration means when the proportion of discrete ice particles in the beverage rises above a predetermined level.

It is still a further object of this invention to provide an apparatus for producing a slush beverage including means for dividing the container into a freezing compartment and a storage compartment, the means being freezable in position to provide a liquid tight seal between the compartments.

It is yet another object of this invention to provide such an apparatus wherein the agitator assembly is mounted on a substantially hollow driven shaft with a drive shaft passing upwardly therethrough and having a skirted connecting cap connecting the driven shaft and the driving shaft.

It is yet a further object of this invention to provide a dispensing valve which is particularly useful in such an apparatus for dispensing slush beverages, which valve includes a conically shaped valve disc which is adapted to break up any clogged ice particles adjacent the discharge opening.

It is yet another object of this invention to provide an apparatus of the character described which has a storage container and a freezing chamber and means for connecting the storage container to the freezing chamber, said means including valve means adapted to fill the freezing chamber, drain the freezing chamber or drain the storage chamber or both simultaneously.

Other objects and advantages of this invention will become apparent from the following description taken in conjunction with the accompanying drawings.

Of the drawings:

FIGURE 5 is an enlarged partial vertical sectional view taken along the line 5—5 of FIGURE 2.

FIGURE 6 is an enlarged partial vertical sectional of the upper portion of the hollow driven shaft and the drive cap.

FIGURE 7 is an enlarged partial sectional view taken along the line 7—7 of FIGURES 2 or 6.

FIGURE 8 is an enlarged partial sectional view taken along the line 8—8 of FIGURE 2 and showing a product divider hook.

FIGURE 9 is an enlarged view taken along the line 9—9 of FIGURE 4 and showing the locking U of the discharge valve stem.

FIGURE 10 is an enlarged side elevational view of the drive motor shown in the bottom portion of FIGURE 2 with the drive connection turned 90°.

FIGURE 11 is a top plan view partially broken away of the drive motor shown in FIGURE 10.

FIGURE 12 is an enlarged view taken along the line 12—12 of FIGURE 11 and showing the compressor shut-off switch.

FIGURE 13 is a partial vertical sectional view of the upper portion of another embodiment of the beverage maker of this invention.

FIGURE 14 is a partial sectional view of yet another embodiment of the beverage maker of this invention.

FIGURE 15 is a view partially in section of still another embodiment of the beverage maker of this invention; and FIGURES 16 through 18 are enlarged views partially in section showing the different positions of the valve core of the valves shown at the bottom of FIGURES 13 and 15.

Figure 1:
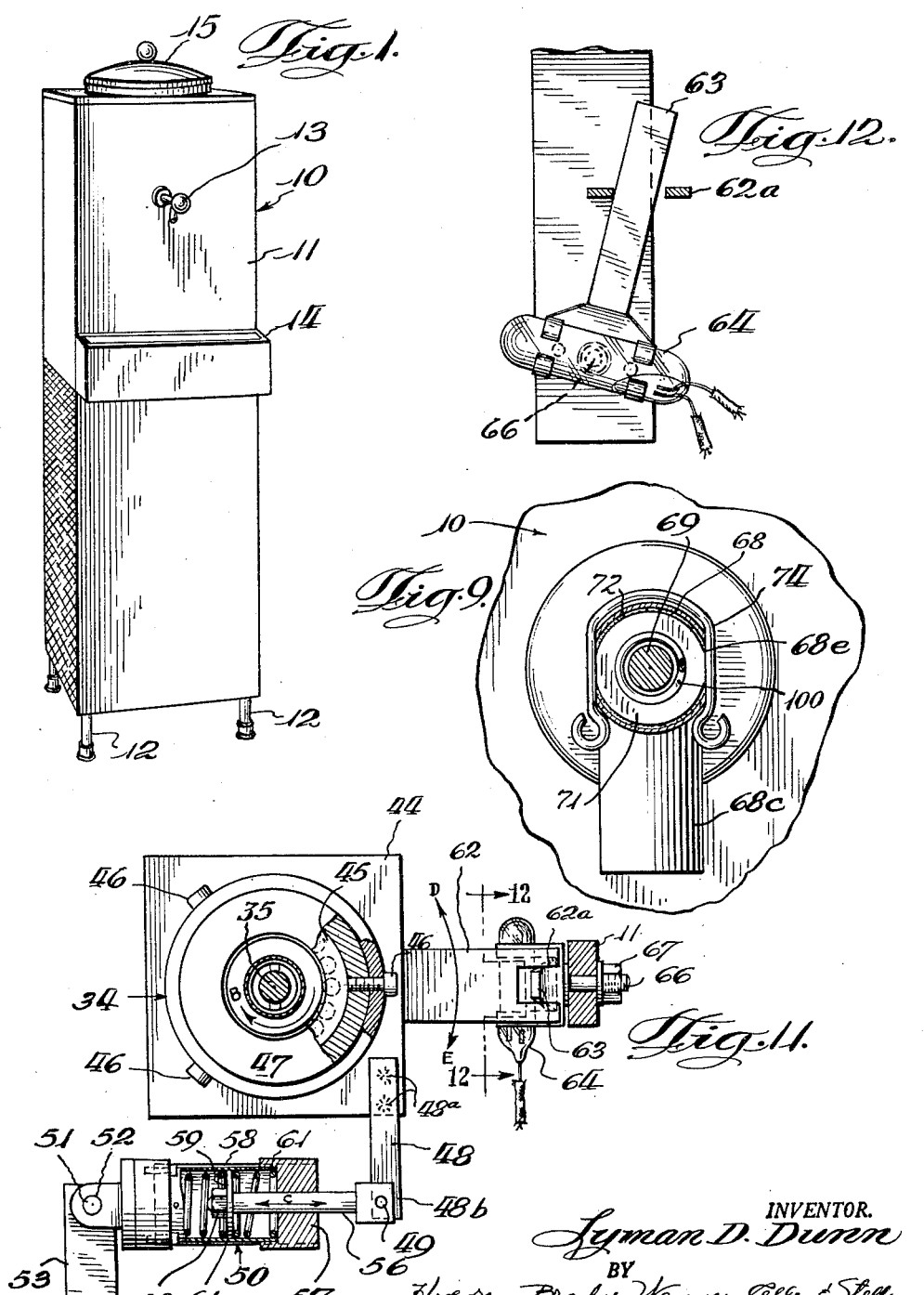
FIGURE 1 is a reduced size perspective view of the beverage maker of this invention.

Referring now to the drawings, in FIGURE 1 is shown a beverage machine 10 including the apparatus of this invention. The machine includes a four-sided cabinet 11 generally constructed of metal material such as stainless steel. The cabinet 11 is provided with legs 12 supporting it off of the floor so that it is relatively simple to clean under the machine. A dispensing valve 13, which will be described later in much greater detail, emerges from the upper portion of the machine. Directly below the valve 13 is a drain-support 14 which performs the dual function of supporting the container to be used in dispensing the beverage and of carrying away the overflow. A cover 15 is provided at the top of the machine which can be removed in order to fill the storage chamber. Although, the machine as shown in FIGURE 1 is a single unit, it is wholly possible and contemplated that double and even triple units can be provided. This would allow a user to dispense several different flavored slush drinks simultaneously.

Figure 2:
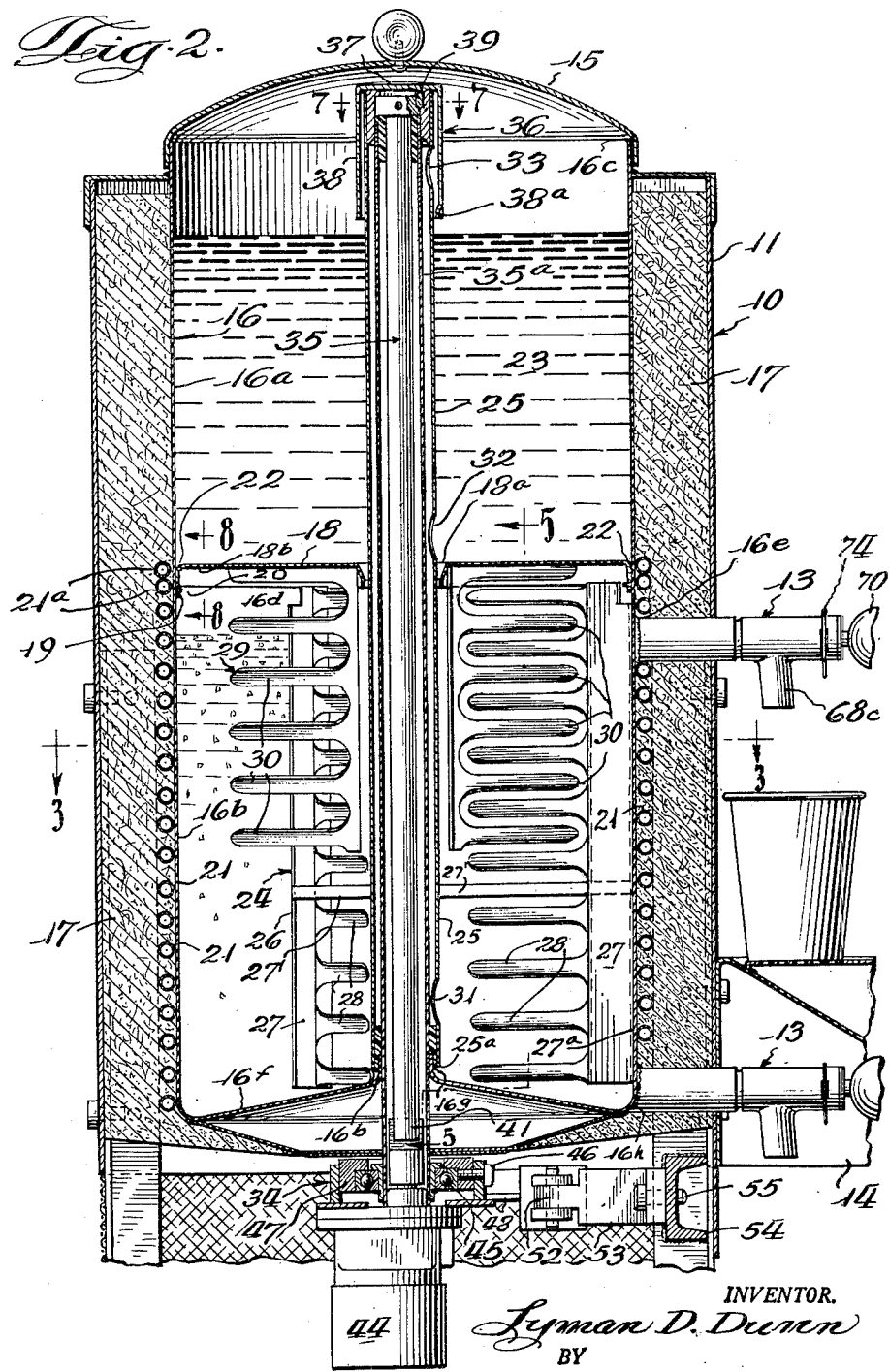
FIGURE 2 is a partial vertical sectional view of the upper portion of the beverage maker.

Referring now to FIGURE 2, the upper portion of the machine 10 includes a stainless steel or the like container 16 which is generally round in cross section (FIGURE 3) and which is surrounded by a layer of insulation 17. The stainless steel or the like exterior cabinet 11 covers the insulation. The container 16 is designed to provide, in this embodiment of the invention, both a storage area 16a and a freezing area of surface 16b. The areas 16a and 16b are separated by a dividing means or partition 18. The partition 18 is removable for cleaning purposes and is held in place by a series of hooks 19 and pins 20 shown in FIGURE 8. The hooks 19 are caused to lock on the pins 20 by a slight turn, and in order to position the partition properly in place, it is inserted into the container into contact with the pins 20, and then rotated a short distance in a counterclockwise direction to lock it in place. A circular aperture 18a is provided in the center of the partition 18 and its purpose will be described later.

The lower portion or freezing area, or surface 16b of the container is surrounded by a plurality of refrigeration coils 21. Th coils are in thermal contact with the wall of the container 16 and are surrounded by the insulation 17. These refrigeration coils are of common construction and are connected to a conventional refrigeration system including a gaseous refrigerant, a compressor, cooling coils and the like, none of which are shown. These refrigerating coils 21 provide ample cooling for the freezing area 16b so that the walls of the container become a freezing surface for any liquid which may repose in the lower portion of the container 16. The coils also provide some cooling for any liquid in the storage area 16a. The upper two coils 21a provide an additional and important function. Because of their proximity, these two coils concentrate a large amount of heat removing capacity at the area of the container 16 which surrounds the partition 18. Since the partition 18 divides the container 16 into a storage compartment 16a and freezing area 16b, it is desirable to prevent leakage of liquid around the partition 18 between it and the container wall. The refrigerating coils 21a perform the function of freezing the partition 18 into place so that a portion of ice will exist at 22 thus making a liquid tight seal between the partition 18 and the container 16 at this point.

In preparing the slush beverage, a fruit flavored aqueous solution is introduced into the upper or storage portion 16a through its open top 16c. This top is closed under normal operating conditions by the cover 15. The solution 23 passes from the upper storage portion to the lower freezing portion in a manner which will be subsequently described, until the lower or freezing portion is substantially completely filled with the solution. Since the walls of the container 16 are refrigerated, a part of the solution will be frozen on the freezing surface 16b.

In order to provide the discrete ice particles for the slush beverage, the material frozen on the surface 16b must be removed. This is done by means of an agitator-scraper 24. The agitator 24 is preferably made of material such as stainless steel, is of welded construction and consists of a body tube or hollow driven shaft 25 to which are welded the blades 26. The blades are actually connected to the shaft 25 by means of three connecting straps 27'. Since each of the blades 26 are similar in construction, only one will be described.

Figure 3:
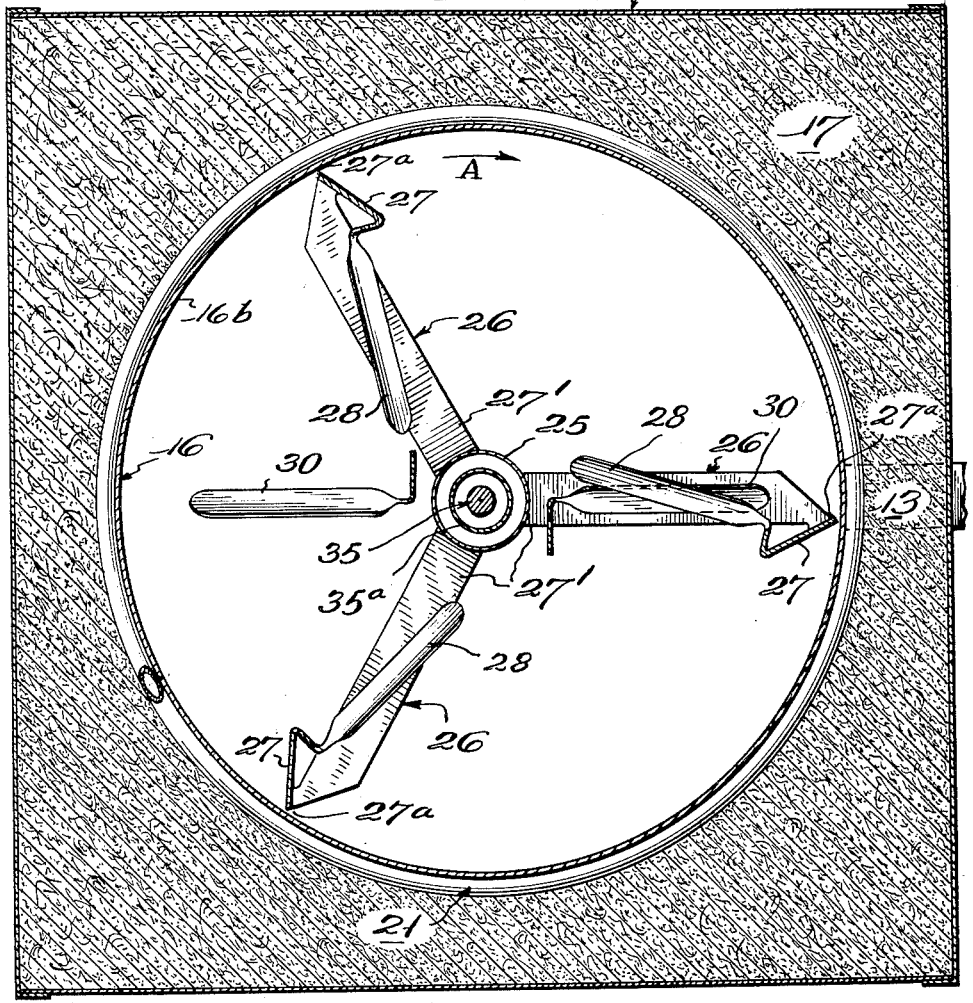
FIGURE 3 is an enlarged sectional view taken along the line 3—3 of FIGURE 2.

Referring particularly to FIGURES 2, 3 and 5, the blades 26 include an outer scraping member or scraping blade 27 which is disposed at an angle to the freezing surface 16b and extends substantially the entire length thereof. (See FIGURE 2.) Each of the blades has a straight or squared outer edge 27a which is positioned closely adjacent the freezing surface 16b. This squared edge is essential for the removal of frozen material from the freezing surface. Extending inwardly from the blade 27 are a plurality of fingers 28. These fingers are bent at an angle of substantially 50° (see FIGURE 5) in the direction of the rotation of the agitator 24 which is shown by the arrow A in FIGURE 3.

The angular disposition of the blade 27 and the fingers 28 performs two important functions in the production of a satisfactory slush beverage. Thus, as the blades rotate, the ice crystals projecting from the freezing surface 16b will be removed by the squared edge 27a. As the blade rotates clockwise in the direction of the arrow A, the angular disposition of the blade 27 directs a large portion of the newly formed ice crystals back toward the freezing surface where, in this supercooled area, a moving wall of ice crystals is formed and the ice crystals grow and form small aggregates with other ice crystals near the freezing surface. As the crystals increase in size and number, a portion of them is forced farther from the freezing surface toward the center of the cylinder to the point where the meshing action of the angled fingers 28 and the fingers 30 on the stationary baffles 29 will break up any relatively large aggregates and tend to "size" or reduce them to small ice crystal aggregates and move them upwardly toward the top 16d of the freezing portion 16b. This increases the consistency of the beverage adjacent the dispensing valve 13 which is yet to be described. However, as a result of the function, the beverage dispensed through the valve 13 has a substantial amount of ice crystals contained therein.

Referring once again to the partition 18, it can be seen that a pair of stationary baffles 29 are attached thereto. These baffles are shorter than the blades 27 and are designed so that the rotating blades 26 and connecting straps 27' will clear the bottom of the baffles 29. Each of the baffles also has a plurality of angularly disposed fingers 30 which are similar in construction and supplement the function of the fingers 28. Thus, these stationary baffle fingers 30 also assist in moving the ice crystals upwardly in the freezing compartment 16b and in mixing and breaking up any agglomerated particles. They also serve the important function of preventing the "wall" of ice crystal aggregates formed adjacent to the freezing surface by the angular disposition of the blade 27 from becoming so rigid that the product cannot be dispensed at valve 13.

As can be seen in FIGURE 2, the body tube or shaft 25 extends upwardly for substantially the full length of the container 16 and passes through the aperture 18a in the partition 18. The tube is also provided with a plurality of openings 31, 32 and 33. Since the tube is hollow, these apertures convert the tube into a filling member so that the liquid 23 can pass from the storage portion 16a to the freezing chamber 16b. Thus, the upper opening 33 acts as a breather while opening 32 acts as an inlet and opening 31 as a discharge. Since it is desirable to discharge the new liquid into the bottom portion of the freezing chamber, it can be seen that the opening 31 performs this function. An added filling means is provided, however, by the opening 18a. This opening allows a small amount of liquid 23 to pass directly into the top of the freezing chamber 16b. Since a certain amount of air will be trapped under the partion 18, a very slight pressure caused by the head of liquid in the storage chamber 16a exists on the material in the freezing chamber 16b. This trapped air provides a cushion which prevents any ice crystals from becoming attached to the under side 18b of the partition 18. The tube 25 joins the upwardly sloping bottom 16f by fitting its end 25a over the collar 16g. The joint provides a substantially liquid tight seal and prevents the liquid from passing therethrough.

A drive assembly 34 is provided for rotating the agitator 24. This assembly includes an elongated driving shaft 35 covered by a sheath 35a which extends up- As previously mentioned, the platform 14 acts as the support for the utensil, such as a cup, to be used in consuming the slush beverage and as a drain for the overflow during filling. This platform 14 also covers the lower or drain valve 13 so that it is not visible to the public eye during operation. A drain line from the platform 14 (not shown) is provided.

Referring now to FIGURE 13, a second embodiment of the apparatus of this invention is shown therein. This embodiment is substantially the same as that previously described with regard to the embodiment in FIGURE 2 insofar as the agitator, the drive system, the refrigeration system and the like, are concerned. Therefore, the description of those particular parts will not be repeated here. The difference between the embodiments lies in the means for introducing the fruit flavored liquid from the storage compartment 16a to the freezing compartment 16b. In this embodiment, a pipe 75 is provided. The pipe is attached at its upper end 75a to the storage chamber 16a. The pipe 75 passes downwardly through the insulation 17 to a point where a valve 76 is interposed. The valve 76 is connected to the pipe 75 by means of a threaded junction 77. The other side of the valve 76 is attached by means of a threaded junction 78 to the lower portion of the freezing chamber 16b. In this embodiment, the partition 18 is both frozen into place at 22 as previously described and has a rubber gasket 79 which prevents any passage of the fluid into the freezing compartment around the driven post 25. It should also be noted that the partition 18 in this construction is slightly sloped away from the shaft 25 so that the liquid tends to flow toward the opening at the pipe 75a.

The valve 76 is a three-position valve as can be seen in FIGURES 16, 17 and 18. Since the construction of the valve is the same in each of these figures, only one will be described. However, the position of the valve core varies in each to show its use.

The valve 76 has a globe-shaped body 80. A ball-shaped core or disc 81 is positioned in the interior of the body 80. This core has a T-shaped orifice 82 therein. Attached to the valve body 81 through a conventional seal is a handle 83 which may be used to change the position of the valve core. In the view shown in FIGURE 16, the valve is lined up to introduce liquid from the upper chamber 16a to the freezing chamber 16b. In the view shown in FIGURE 17, the valve is lined up to allow passage of fluid from the upper chamber out through a drain opening 85. In the view shown in FIGURE 18, the valve is lined up to allow the passage of liquid from the lower freezing chamber 16b out through the drain 85. It is also possible to line up the valve core so that it would simultaneously drain the upper and lower chambers through the drain opening 85. This would be done by turning the valve handle 83 through a 180° arc from that shown in FIGURE 17.

With this type of valve construction, it is possible to first of all fill the lower chamber 16b with liquid. It is also possible to drain the upper chamber 16a or the lower chamber 16b separately, or to drain them both together, thus, very adequate control is provided for the liquid materials in the apparatus.

FIGURE 14 shows yet another embodiment of the invention. In the constructions explained thus far, liquid reservoirs or storage areas have been provided in the upper part of the mechanism. In the embodiment shown in FIGURE 14, the liquid storage is provided separate and apart from the entire apparatus in some area not shown, so that the liquid is introduced through a pipe 86 by a pump of conventional type (not shown) or by gravity feed and the frozen beverage is removed through a valve (not shown) or a pipe 87. The construction of the apparatus shown in FIGURE 14 is similar to that shown in FIGURE 2, and therefore does not require explanation here. However, it will be noted that the driving shaft 35 is substantially shorter and that the driven shaft 25 is also substantially shortened. This is necessary only because the upper portion is removed. The driving connection between the driven and driving shafts is by a tongue and groove coupling 88 at the top of the driving and driven shafts. A flat substantially leak proof cover 89 is provided with a handle 90 over the open top of the freezing chamber 116b.

FIGURE 15 shows another modification of the apparatus of this invention. In this construction, the lower chamber 216b is constructed separate and apart from the upper chamber 216a, however, a flanged portion 91 is provided on the lower or freezing chamber on which the upper chamber may be located. A valve system similar to that explained in regard to FIGURE 13 is provided with the exception that a separate one-way valve 92 is attached to the upper chamber 216a. The discharge orifice 93 is designed to be threadedly connected 94 to the pipe 175. Thus, the upper and lower portion 216a and 216b may be separated with the mixtures present therein, and then may be joined together if this is ever desirable at the operating area.

It is also possible to construct the apparatus of this invention in a horizontal position. Thus, the freezing container would be horizontally disposed and the scraping member or scraping blade would also be horizontally disposed. The location of the dispensing valve would be somewhat different in that it would have to be in the present top of the vertically disposed container. However, such a change would be apparent to those skilled in the art. It would also be necessary to provide a thrust bearing of conventional construction for the rotating scraper.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. Apparatus for producing a fruit flavored drink or the like, including a plurality of discrete ice particles, comprising: a container having a freezing surface and a discharge means; refrigeration means adapted to solidify a liquid on said freezing surface; and a movable agitator positioned in said container and adapted to remove said solidified material from said container freezing surface as discrete particles and to mix said particles with the remainder of said liquid, said agitator comprising, an outwardly extending blade having an ice scraping edge, said blade having means adapted to move said particles after removal back toward said freezing surface and maintain them in an area adjacent said surface for a sufficient time to allow said particles to grow and to thereafter mix said particles with said remaining liquid.

2. The device of claim 1 wherein said means includes an angled portion defining an angle with said freezing surface less than 90° in the direction of motion of said agitator.

3. Apparatus for producing a fruit flavored drink or the like, including a plurality of discrete ice particles, comprising: a container having a freezing surface and a discharge means located adjacent the upper portion thereof; refrigeration means adapted to solidify a liquid on said freezing surface; and a movable agitator positioned in said container and adapted to remove said solidified material from said container freezing surface as discrete particles and to mix said particles with the remainder of said liquid, said agitator comprising an outwardly extending blade having an end portion terminating in an ice scraping edge, said end portion having an angled portion defining an angle with said freezing surface less than 90° in the direction of motion of said agitator being adapted to maintain said newly removed ice particles in a location adjacent said freezing surface for a sufficient time to cause them to increase in size.

wardly through the hollow body tube 25 and is of substantially equal length thereto. This driving shaft 35 is connected to the driven shaft 25 by means of a skirted cap 36 which is more clearly shown in FIGURE 6. The cap 36 is cylindrical in construction having a top 37 and a wall 38 which extends downwardly therefrom. Depending from the inner surface of the top 37 is a pin 39. This pin is designed to engage both the driven shaft 25 and the driving shaft 35. This function is accomplished by the recesses 40 and 41 provided in the driving shaft and driven shaft. With the pin 39 in position in these recesses, the shafts are connected together and have sufficient strength so that driving force is transmitted to the agitator 24.

The skirted cap 38 provides a secondary function in that its elongated wall 38 extends over the breathing opening 33. At a point on the lower portion of the skirt 38, a crimped area 38a grips the driven shaft 25. However, the remainder of the cap skirt is spaced from the driven shaft 25 as can be seen at 40. This construction prevents splashing of the liquid through the breather hole 33 which is a common occurrence while the agitator is in motion and the liquid 23 is entering the inlet opening 32. If any of the liquid tends to splash out of the breather hole 33 it will be impeded by the skirt 38 and merely drain down the sides of the driven shaft 25.

The driven shaft 25 is connected to the motor 44 by a drive coupling 41 which includes a female slot 42 and a male bar 43. The coupling 41 allows the rotating force to be transmitted from the motor 44 to the driven shaft 25.

The motor 44 is of conventional electric design and is mounted on a ball bearing race 45 so that it would be completely free to rotate if not anchored. The motor is held in position on the ball bearing race by a set screw 46 and a collar 47. As mentioned above, the motor is free to turn in any direction except that it is restrained by the arm 48 which is welded at one end 48a to the motor 44. At the other end 48b the arm is attached by a pin 49 to a torque cylinder or dash pot 50. The dash pot is swivelly mounted 51 at its other end by means of a pin and fork 52 and a bar 53 so that it is allowed a restricted amount of motion. The bar 53 is attached to a bracket 54 on the side of the cabinet by means of a screw 55.

The dash pot includes a piston 56 which is attached by the pin and fork 49 to the arm 48. The piston 56 passes through the stuffing box 57 into the interior of the dash pot 50. The dash pot is surrounded by a cylinder 58 which is substantially air tight. A washer 59 is seated at the other end of the piston 56 and held there by a nut 60. A spring 61 of preset force is contained in the cylinder 58 with the washer 59 being located at about the middle 61a in between a pair of windings of the spring 61.

A second arm 62 is attached to the motor 44 and extends away from it in a direction 90° away from the arm 48. The end of the arm 62 is forked at 62a so that the upstanding arm 63 of a mercury switch 64 extends therethrough. The mercury switch 64 is electrically located in the power source line to the refrigeration system.

As a result of the drive assembly construction, automatic control is provided for maintaining the slush beverage in the freezing compartment 16b at the desired consistency. Since the shaft of the drive motor 44 rotates in the direction of the arrow B, it would tend to force the motor on its ball bearing mounting 45 in the opposite direction. However, it is prevented from doing so by the connection of the motor 44 through the arm 48 to the plunger 56 of the dash pot 50. The dash pot is preset to a predetermined force and will prevent the in and out motion of the plunger in the direction of the arrow C until this force is overcome. The force will be overcome when the consistency of the slush beverage becomes such that it imposes a heavy strain on the agitator 24. This heavy strain or torque will be transmitted through the drive coupling 41 to the motor 44. As the torque exceeds the preset spring force of the dash pot, the plunger 56 will be withdrawn therefrom, allowing the motor to turn in the direction of the arrow D. When the motor 44 has rotated a sufficient distance, the arm 62 will move the arm 63 on the mercury switch 64 to a position cutting off the current to the refrigeration system. The refrigeration system will remain in an off condition until the consistency of the slush reduces through warming or dispensing to a point where the spring 61 overcomes the torque exerted on the dash pot. This will force the motor in the direction of the arrow E and by moving the arm 63 will again energize the refrigeration system. Chattering of the torque drive is prevented since the dash pot 50 is substantially air tight and is in effect damped, thus providing a delay in the return of the plunger 56 so that there could not be continuous on and off motion of the motor 44.

The mercury switch 64 is attached to the side of the cabinet 11 by means of a bolt 66 and a wing nut 67. This allows the mercury switch 64 to rotate to the on and off positions so that the power to the refrigeration system may be interrupted to allow for a warming in the freezing chamber 16b and a decrease in the thickness or consistency of the slush beverage contained therein.

Figure 4:
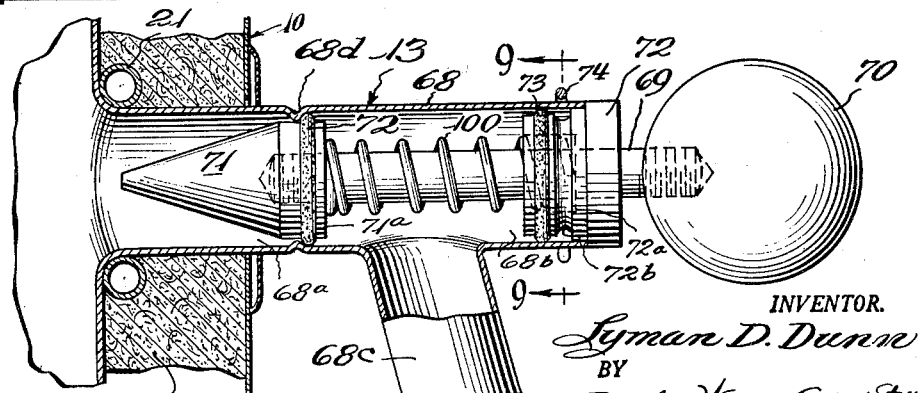
FIGURE 4 is an enlarged vertical sectional view of either of the discharge valves shown in FIGURE 2.

Referring now to FIGURE 4, a sectional view of the dispensing valve 13 previously mentioned, is shown therein. This valve is used in two locations on the mechanism shown in FIGURE 2. Thus, it is connected to the freezing chamber 16b near its upper limit at 16e. This same type of valve is attached to the lower portion of the freezing chamber at 16h. In both instances, the valve is welded to the chamber to provide a liquid tight fit.

Since the valves are identical in construction, only one will be described. However, it is to be understood that the upper valve is used for dispensing the beverage while the lower valve is used to drain the freezing chamber 16b.

The valve 13 includes a T-shaped body 68 which is cylindrical in cross section and which has arms 68a and 68b making the upper portion of the T and a dispensing portion 68c which makes up the lower portion of the T. The valve has a stem 69 which has a ball 70 screwed on one end thereof to act as a handle. At the other end of the stem 69 is a conically-shaped valve disc 71. Near the base of the cone of the valve disc 71 is located an O-ring 72. The O-ring seats against a valve seat which is an indentation 68d located circumferentially around the body of the valve 68a near its inner portion. An apertured stuffing box 72 is provided near the outer end of the valve body 68b. The valve stem 69 is inserted through this stuffing box. Near the inner end of the stuffing box 72 is positioned a second O-ring 73 which seals against the inner portions of the valve body to provide a substantially liquid tight seal. The stuffing box 72 is also recessed at 72a to receive a helical spring 100 which extends up into the box. The other end of the helical spring abuts against the base 71a of the conical valve disc 71. This spring maintains the valve at a closed position with the O-ring 72 resting against the valve seat 68d. A second recess 72b is provided around the intermediate portion of the stuffing box. This recess is designed to receive a U-ring 74 which can be more clearly seen in FIGURE 9. The U-ring grips the stuffing box 72 by means of the recess apertures 68e in the valve body. This allows for easy removal of the valve core stem and disc. Thus the U-ring 74 is simply removed and the entire valve together with the conical disc, the spring, etc., can easily be removed and cleaned. The valve 13 is particularly useful in a slush apparatus since the conically shaped valve disc 71 will break up agglomerated ice particles in the valve body 68a. It will also positively shut off the flow of slush since on closing, it gradually decreases the passage as the disc 71 moves into closing position. This tends to force back the ice particles, thus preventing them from interfering with the seat 68d.

4. The device of claim 3 wherein said blade has an inwardly extending finger adapted to mix said particles with said liquid, said finger being angularly turned to impart motion to said particles during rotation of said agitator in a discharge direction.

5. Apparatus for producing a fruit flavored drink or the like, including a plurality of discrete ice particles, comprising: a container having a freezing surface and a discharge means located adjacent an upper portion thereof; refrigeration means adapted to solidify a liquid on said freezing surface; and a rotatable agitator positioned in said container and adapted to remove said solidified material from said container freezing surface as discrete particles, and to mix said particles with the remainder of said liquid, said agitator comprising an elongated central shaft, a plurality of outwardly extending blades attached to said shaft in spaced relationship, each of said blades having an end scraping blade portion angularly disposed with respect to said freezing surface in a direction away from the direction of rotation of said agitator to form an angle less than 90°, the terminal freezing surface engaging edges of said scraping blades being squared whereby during rotation ice will be removed from said freezing surface as small discrete particles and maintained as such adjacent said surface to allow for increase in size, each of said blades having a plurality of fingers extending inwardly from said end blade portion, said fingers being angularly disposed and adapted to mix said particles in said liquid and to move said particles toward said discharge means.

6. The device of claim 5 including stationary means adapted to mesh with said rotatable agitators to further break up, mix and move said particles and liquid.

7. The device of claim 6 wherein said stationary means includes agitators having a plurality of blades, each having angularly disposed fingers.

8. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles, and to mix said particles with the remainder of liquid; and means for driving said agitator including a drive motor positioned on a rotatable mounting, means for restraining the rotation of said motor whereby driving force is imparted to said agitator, said means for restraining being responsive to an increase in the consistency of said ice-particle-liquid mixture to allow said motor to rotate on said mounting, means responsive to the rotation of said motor for causing a shutdown of said refrigeration means for a period of time whereby said mixture consistency may decrease a desirable amount, and damping means for preventing chattering of said restraining means.

9. Apparatus for producing a fruit flavored drink or the like, including a plurality of discrete ice particles, comprising: a container having a freezing surface; refrigeration means adapted to solidify a liquid on said freezing surface; a movable agitator including a central shaft positioned in said container and adapted to remove said solidified material from said container freezing surface as discrete particles, and to mix said particles with the remainder of liquid, and a driving mechanism connected to said agitator shaft including a drive motor rotatably mounted on a ball bearing race, resilient means including a dash pot anchoring said motor against rotation whereby driving force is transmitted to said agitator shaft, said resilient means being responsive to an increase in the consistency of said ice-particle-liquid mixture to allow said motor to rotate on said mounting, said dash pot being operative to delay counter-rotation of said motor thereby preventing chattering of said driving mechanism, and means responsive to the rotation of said motor for causing a shut-down of said refrigeration means for a period of time whereby said mixture consistency may decrease a desirable amount.

10. The device of claim 9 wherein said means responsive to the rotation of said motor includes a mercury switch connected to said refrigeration means.

11. Apparatus for producing a fruit flavored drink or the like, including a plurality of discrete ice particles, comprising: a container having a freezing surface; refrigeration means adapted to solidify a liquid on said freezing surface; means for removing said solid material from said surface; removable means for dividing said container into a liquid freezing compartment and a liquid storage compartment; means in said refrigeration means for increasing the amount of heat exchange at the location of said dividing means whereby said dividing means is frozen into place to provide a substantially liquid tight seal between said dividing means and said container.

12. Apparatus for producing a fruit flavored drink or the like, including a plurality of discrete ice particles, comprising: a container divisible into a liquid freezing compartment and a liquid storage compartment, refrigeration means surrounding a portion of said container to provide a freezing surface therein, removable dividing means in said container, a portion of said refrigeration means surrounding the portion of the container substantially at the location of said dividing means whereby said dividing means may be frozen into place to provide a substantially liquid tight seal between said dividing means and said container.

13. Apparatus for producing a fruit flavored drink or the like, including a plurality of discrete ice particles, comprising: a container having walls acting as a freezing surface; refrigeration coils surrounding at least a portion of said container; means in said freezing chamber for removing and mixing ice particles removed from said freezing surface; a removable divider adapted to be positioned in said container to divide it into a liquid storage chamber and a liquid freezing chamber, at least one of said coils surrounding the portion of said container adjacent which said divider is located whereby said divider may be frozen into place to provide a substantially liquid tight seal between said divider and said container.

14. Apparatus for producing a fruit flavored drink or the like, including a plurality of discrete ice particles, comprising: a container having a freezing chamber and a liquid storage chamber vertically disposed thereover, a movable agitator assembly including a hollow driven shaft, said driven shaft passing from said storage chamber to said freezing chamber and having a plurality of apertures whereby liquid may pass from the storage chamber to the freezing chamber, the uppermost of said apertures being a breather opening and being adjacent the top of said post, a drive shaft extending within said hollow driven shaft and terminating adjacent the top thereof and means adapted for connecting said driven shaft and said drive shaft while also preventing splashing from said breather opening.

15. Apparatus for producing a fruit flavored drink or the like, including a plurality of discrete ice particles, comprising: a container having a freezing chamber and a liquid storage chamber vertically disposed thereover, a movable agitator assembly including a hollow driven shaft, said driven shaft passing from said freezing chamber to said storage chamber and having a plurality of apertures whereby liquid may pass from the storage chamber to the freezing chamber, the uppermost of said apertures being a breather opening and being adjacent the top of said shaft, a drive shaft extending within said hollow driven shaft and terminating adjacent the top thereof, said driven shaft and said drive shaft having matable recesses adjacent the tops thereof; and a skirted cap having a depending pin therein, said pin being adapted to fit into said matable recesses to connect said driven shaft and said drive shaft, and the skirted portion of said cap being adapted to prevent splashing from said breather opening.

16. Apparatus for producing a fruit flavored drink or the like, including a plurality of discrete ice particles comprising: a container having a freezing surface and a discharge means located adjacent an upper portion thereof; refrigeration means including a plurality of coils adapted to solidify a liquid on said freezing surface; a rotatable agitator positioned in said container and adapted to remove said solidified material from said container freezing surface as discrete particles and to mix said particles with the remainder of said liquid, said agitator comprising an elongated cylindrical hollow shaft and a plurality of outwardly extending blades attached to said shaft in spaced relationship, said blades having end scraping blade portions angularly disposed with respect to said freezing surface in a direction away from the direction of rotation of said agitator, the terminal freezing surface engaging edges of said scraping blades being squared whereby during rotation ice will be removed from said freezing surfaces as small discrete particles and maintained as such adjacent said surface to allow for increase in size, each of said blades having a plurality of fingers extending inwardly from said end blade portion, said fingers being angularly disposed and adapted to mix said particles in said liquid to move said particles toward said discharge means; stationary agitators having a plurality of blades each having angularly disposed fingers adapted to mesh with said rotatable agitators to further break up, mix and move said particles and liquid; a driving mechanism connected to said agitator including a drive motor rotatably mounted on a ball bearing race, resilient means anchoring said motor against rotation whereby driving force is transmitted to said agitator, said resilient means being responsive to an increase in the consistency of said ice-particle-liquid mixture to allow said motor to rotate on said mounting and means responsive to the rotation of said motor for causing a shut-down of said refrigeration means for a period of time whereby said mixture consistency may decrease a desirable amount; a removable divider adapted to be positioned in said container to divide it into a liquid storage chamber and a liquid freezing chamber, at least one of said coils of said refrigeration means surrounding the portion of said container adjacent said divider whereby said divider may be frozen in place to provide substantially a liquid-tight seal between said divider and container; said agitator shaft passing from said freezing chamber to said storage chamber and having a plurality of apertures whereby liquid may pass from the storage chamber to the freezing chamber, the uppermost of said apertures being a breather opening and being adjacent the top of said shaft, a drive shaft extending within said hollow driven shaft and terminating adjacent the top thereof, said drive shaft being connected to said drive mechanism, said driven shaft and said drive shaft having matable recesses adjacent the tops thereof; and a skirted cap having a depending pin therein, said pin being adapted to fit into said matable recesses to connect said driven shaft and said drive shaft and the skirted portion of said cap being adapted to prevent splashing from said breather opening.

17. The apparatus of claim 3 wherein said agitator has a plurality of blades.

18. The apparatus of claim 4 wherein said blade has a plurality of inwardly extending fingers.

19. Apparatus for producing a fruit flavored drink or the like, including a plurality of discrete ice particles, comprising: a container having a freezing surface and a discharge means located adjacent the upper portion thereof; refrigeration means adapted to solidify a liquid on said freezing surface; and a movable agitator positioned in said container and adapted to remove said solidified material from said container freezing surface as discrete particles and to mix said particles with the remainder of said liquid, said agitator comprising an outwardly extending blade having an end portion terminating in a squared ice scraping edge, said end portion having an angled portion defining an angle with said freezing surface less than 90° in the direction of motion of said agitator and being adapted to maintain said newly removed ice particles in a location adjacent said freezing surface for a sufficient time to cause them to increase in size, said blade also including a plurality of inwardly extending fingers adapted to mix said particles with said liquid, said fingers being angularly turned to impart motion to said particles during rotation of said agitator in a discharge direction.

20. The device of claim 7 wherein said fingers are angularly turned so as to also impart motion to said particles in a discharge direction while said agitator is mixing said particles with said liquid.

21. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles, and to mix said particles with the remainder of liquid; means for driving said agitator, said driving means being responsive to an increase in the consistency of said ice-particle-liquid mixture to cause a shut-down of said refrigeration means for a period of time whereby said mixture consistency may decrease a desirable amount; and means for preventing chattering of said driving means.

22. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles and to mix said particles with the remainder of the liquid; means for driving said agitator including a drive motor positioned on a rotatable mounting; control means operatively connected to the refrigeration means whereby intermittent actuation of said control means regulates the temperature and consistency of the ice-particle-liquid mixture in the container; and damping means for providing a time lag between successive actuations of the control means for preventing chattering of the driving means.

23. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles and to mix said particles with the remainder of the liquid; means for driving said agitator including a drive motor positioned on a rotatable mounting; control means operatively connected to the refrigeration means, the control means being capable of intermittent actuation to control the temperature and consistency of the ice-particle-liquid mixture in the container; and damping means connected to the motor for gradual movement to yieldably restrain rotation of the motor on its rotatable mounting as the consistency of the mixture increases, said damping means normally maintaining the control means operatively connected to said refrigeration means and being gradually yieldable to a predetermined torque exerted by the motor to cause disconnection of the control means with the refrigeration means for a predetermined period of time to maintain the desired consistency of the ice-particle-liquid mixture.

24. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles and to mix said particles with the remainder of the liquid; means for driving said agitator; control means operatively connected to the refrigeration means for intermittent actuation thereof to regulate the temperature and consistency of the ice-particle-liquid mixture in the container; and damping means operatively connected to the control means for providing a time lag between successive actuations of the control means for preventing chattering of the driving means.

25. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles and to mix said particles with the remainder of the liquid; means for driving said agitator; control means operatively connected to the refrigeration means for intermittent actuation thereof to regulate the temperature and consistency of the ice-particle-liquid mixture in the container; and damping means for intermittently interrupting the connection between the control means and the refrigeration means in response to the torque load of the driving means to afford a time lag between successive actuations of the control means so as to decrease the consistency of the mixture and reduce the torque load on the driving means.

26. Apparatus for producing a fruit flavored drink or the like, including a plurality of discrete ice particles, comprising: a container having a freezing surface; refrigeration means adapted to solidify a liquid on said freezing surface; a movable agitator positioned in said container and adapted to remove said solidified material from said container freezing surface as discrete particles and to mix said particles with the remainder of the liquid; means for driving said agitator; control means operatively connected to the refrigeration means for intermittent actuation thereof to regulate the temperature and consistency of the ice-particle-liquid mixture in the container; and damping means for normally maintaining the operative connection between the control means and the refrigeration means, said damping means being responsive to a predetermined torque load of the driving means to disconnect the control means and refrigeration means and affording a time lag between successive actuations of the control means to permit a decrease in the consistency of the mixture and a reduction in the torque load on the driving means, said reduction in torque load permitting the damping means to again connect the control means and refrigeration means.

References Cited in the file of this patent

UNITED STATES PATENTS

| | | |
|---|---|---|
| 1,351,302 | Sanna | Aug. 31, 1920 |
| 1,408,774 | Peck | Mar. 7, 1922 |
| 1,763,567 | Simmons | June 10, 1930 |
| 1,950,133 | Blood | Mar. 6, 1934 |
| 2,042,928 | Da Costa | June 2, 1936 |
| 2,055,735 | Stull | Sept. 29, 1936 |
| 2,066,431 | Taylor | Jan. 5, 1937 |
| 2,150,792 | Willat | Mar. 14, 1939 |
| 2,199,038 | Brix-Hansen | Apr. 30, 1940 |
| 2,263,731 | Hyuek | Nov. 25, 1941 |
| 2,303,664 | Short | Dec. 1, 1942 |
| 2,541,814 | Gaddini | Feb. 13, 1951 |
| 2,599,021 | Bastian | June 3, 1952 |
| 2,713,474 | Read | July 19, 1955 |
| 2,723,534 | Wilbushewich | Nov. 15, 1955 |
| 2,778,202 | Fischer et al. | Jan. 22, 1957 |
| 2,788,643 | Martin | Apr. 16, 1957 |
| 2,808,706 | Updegraff | Oct. 8, 1957 |